United States Patent
Tiainen et al.

(10) Patent No.: US 10,116,192 B2
(45) Date of Patent: Oct. 30, 2018

(54) DEVICE FOR PRODUCING A ROTATIONAL POSITION SIGNAL AND A METHOD FOR PRODUCING ROTATIONAL POSITION SIGNALS

(71) Applicant: Visedo Oy, Lappeenranta (FI)

(72) Inventors: Risto Tiainen, Pulp (FI); Antti Tarkiainen, Lappeenranta (FI); Matti Iskanius, Lappeenranta (FI); Tero Jarvelainen, Lappeenranta (FI)

(73) Assignee: DANFOSS MOBILE ELECTRIFICATION OY, Lappeenranta (FI)

( * ) Notice: Subject to any disclaimer, the term of this patent is extended or adjusted under 35 U.S.C. 154(b) by 81 days.

(21) Appl. No.: 15/019,362

(22) Filed: Feb. 9, 2016

(65) Prior Publication Data
US 2016/0238409 A1 Aug. 18, 2016

(30) Foreign Application Priority Data
Feb. 16, 2015 (EP) ..................................... 15155238

(51) Int. Cl.
*H02K 29/08* (2006.01)
*H02K 11/225* (2016.01)
(Continued)

(52) U.S. Cl.
CPC ........... *H02K 11/225* (2016.01); *G01D 5/204* (2013.01); *H02P 6/16* (2013.01)

(58) Field of Classification Search
CPC ................................. H02K 11/225; H02P 6/16
(Continued)

(56) References Cited

U.S. PATENT DOCUMENTS

| 5,646,496 A * | 7/1997 | Woodland | G05B 19/33 |
| | | | 318/632 |
| 2007/0126392 A1 | 6/2007 | Suzuki | |

(Continued)

FOREIGN PATENT DOCUMENTS

| EP | 1 424 264 A2 | 6/2004 |
| EP | 1 942 315 A2 | 7/2008 |

OTHER PUBLICATIONS

EP Search Report, dated Jul. 24, 2015, from corresponding EP application.

*Primary Examiner* — Erick Glass
(74) *Attorney, Agent, or Firm* — Young & Thompson (57) ABSTRACT

A device (101) for producing a position signal indicative of rotational position of a resolver is presented. The device comprises a signal transfer interface (102) for receiving first and second alternative signals, and a processing system (103) for generating the position signal on the basis of the amplitudes of the first and second alternative signals and the polarity of an excitation signal of the resolver. The device is configurable to operate in a first operational mode where a local signal generator (104) generates the excitation signal and the device transmits the excitation signal to the resolver. The device is configurable to operate also in a second operational mode where the device receives information indicative of the polarity of the excitation signal from another device. Thus, devices of the kind described above can be used in a system where many converters are driving separate windings systems of an electrical machine.

13 Claims, 5 Drawing Sheets

(51) Int. Cl.
  *H02P 6/16* (2016.01)
  *G01D 5/20* (2006.01)
(58) Field of Classification Search
  USPC .................................................... 318/400.39
  See application file for complete search history.

(56) References Cited

U.S. PATENT DOCUMENTS

| | | | |
|---|---|---|---|
| 2012/0010849 A1* | 1/2012 | Yamada | G01D 5/2073 |
| | | | 702/151 |
| 2013/0249452 A1 | 9/2013 | Shinohara | |
| 2013/0262009 A1 | 10/2013 | Oowada | |
| 2014/0361720 A1* | 12/2014 | Miyachi | H02P 6/16 |
| | | | 318/400.39 |
| 2015/0137728 A1* | 5/2015 | Wand | G05B 19/31 |
| | | | 318/605 |

* cited by examiner

DEVICE FOR PRODUCING A ROTATIONAL POSITION SIGNAL AND A METHOD FOR PRODUCING ROTATIONAL POSITION SIGNALS

FIELD OF THE INVENTION

The disclosure relates to a device for producing a position signal indicative of rotational position of a resolver. Furthermore, the disclosure relates to a method for producing many position signals each being indicative of rotational position of a resolver.

BACKGROUND OF THE INVENTION

An electrical drive system comprises typically an electrical machine for driving an actuator and a converter for controlling the electrical machine. The actuator can be for example a wheel or a chain track of a mobile machine or a tool of an immobile machine. The converter can be for example a frequency converter. In many cases, an electrical drive system comprises a resolver for detecting the rotational position of the rotor of the electrical machine and the converter is configured to control the operation of the electrical machine at least partly on the basis of the detected rotational position of the rotor. The resolver can be for example a variable reluctance "VR" resolver which receives an alternative excitation signal and produces first and second alternative signals whose amplitudes are dependent on the rotational position of the resolver so that envelopes of the first and second alternative signals have a mutual phase shift. A variable reluctance resolver is advantageous in the respect that there is no need for windings in the rotor of the resolver. It is, however, also possible that the resolver is a wound-rotor resolver that comprises brushes or a rotary transformer for transferring an excitation signal to the rotor winding of the resolver. The converter is configured to transmit the excitation signal to the resolver and to receive the above-mentioned first and second alternative signals from the resolver and to generate a position signal indicative of the rotational position on the basis of the amplitudes of the first and second alternative signals and the polarity of the excitation signal.

In many electrical drive systems, an electrical machine is a multi-winding machine that comprises two or more winding systems each of which is supplied with a separate converter. The electrical machine may comprise for example two three-phase stator windings so that there is an angle of 30 electrical degrees between the respective magnetic axes of the two three-phase stator windings. In this case, each of the converters needs information indicative of the rotational position of the rotor of the electrical machine. Typically, a converter such as e.g. a frequency converter comprises a signal transfer interface for transmitting the excitation signal to a resolver and for receiving the above-mentioned first and second alternative signals from the resolver. A straightforward approach is to use as many resolvers as there are converters but it would be more cost effective to use a single resolver for all the converters. Furthermore, from the viewpoint of the product portfolio management, mutually similar converters should be capable of being used for the different winding systems of the electrical machine.

Publication US2013262009 describes a position detection device that comprises a demodulation section for receiving modulated wave signals obtained by position dependent modulation of an alternating current excitation signal and for generating position information based on the modulated wave signals by using a plurality of sampling values of the modulated wave signals. The demodulation section comprises: a) an alternating current excitation signal sampling section configured to sample the alternating current excitation signal, b) a detection section configured to receive an output of the alternating current excitation signal sampling section and execute an eliminating process of eliminating an influence caused by the sign of the alternating current excitation signal from the position information when the position information is generated based on the modulated wave signals, and c) an avoidance section configured to avoid using the alternating current excitation signal in the generation of the position information when the absolute value of the alternating current excitation signal is at most a regulated value. Publication EP1942315 describes a short-circuit detection circuit for detecting a short circuit of a signal line connected to a resolver where an excitation signal is supplied to an exciter coil and two detection signals of sine-phase and cosine-phase are electromagnetically induced in two detection coils. The short-circuit detection circuit comprises an excitation-line malfunction detection circuit for a) comparing potentials at both ends of the exciter coil to which the excitation signal is supplied by a push-pull method, b) for detecting a short circuit to the ground and/or a short circuit to the power supply based on a duty cycle of a rectangular-wave indicating a result of the comparison of the potentials at both ends of the exciter coil, and c) for outputting an excitation-line malfunction detection signal indicating a result of the detection of the short circuit.

SUMMARY OF THE INVENTION

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In accordance with the invention, there is provided a new device for producing a position signal indicative of rotational position of a resolver. A device according to the invention comprises:
- a signal transfer interface for receiving a first alternative signal and a second alternative signal, the amplitudes of the first and second alternative signals being dependent on the rotational position of the resolver so that the envelopes of the first and second alternative signals have a mutual phase shift,
- a processing system for generating the position signal at least partly on the basis of the amplitudes of the first and second alternative signals and the polarity of an excitation signal of the resolver, and
- a signal generator.

The device is configurable to operate in a first operational mode where the signal generator is configured to generate the excitation signal and the signal transfer interface is configured to transmit the excitation signal to the resolver and to transmit information indicative of the polarity of the excitation signal to one or more other devices. Alternatively, the device is configurable to operate in a second operational mode where the signal transfer interface is configured to receive the information indicative of the polarity of the excitation signal from one of the other devices and where the received information indicative of the polarity of the excitation signal is independent of operation of the signal generator.

In accordance with the invention, there is provided also a new converter system that comprises converters, e.g. frequency converters, for controlling voltages of two or more winding systems of one or more electrical machines. The converters comprise devices according to invention so that each of the converters comprise one of the devices, and a first one of the devices is in the above-mentioned first operational mode and other ones of the devices are in the above-mentioned second operational mode. The converter system comprises first signal transfer paths for transferring the excitation signal generated by the first one of the devices to a resolver for detecting rotational position of the one or more electrical machines and for transferring information indicative of the polarity of the excitation signal from the first one of the devices to the other ones of the devices, and second signal transfer paths for transferring the first and second alternative signals from the resolver to the devices for producing the position signals.

Therefore, each of the above-mentioned converters may comprise a similar device for producing the position signals. Thus, the converters can be mutually similar at least in this respect.

In accordance with the invention, there is provided also a new electrical drive system that comprises:
one or more electrical machines comprising two or more winding systems,
a resolver for detecting rotational position of the one or more electrical machines, and
a converter system according to the invention for controlling the one or more electrical machines.

The electrical drive system may comprise for example an electrical machine having at least two winding systems so that directions of the respective magnetic axes of the winding systems are different from each other. The electrical machine may comprise for example two three-phase stator windings so that there is an angle of 30 electrical degrees between the respective magnetic axes of the two three-phase stator windings. It is however also possible that there are two or more electrical machines so that the shafts of the electrical machines are mechanically interconnected directly or with a gear so that the rotational positions of the shafts are bound to each other.

In accordance with the invention, there is provided also a new working machine that can be, for example but not necessarily, a tractor, a bucket charger, a road drag, an excavator, a bulldozer, a stone crusher, or a wood chipping machine. A working machine according to the invention comprises:
a combustion engine, and
an electromechanical power transmission chain between the combustion engine and one or more actuators, e.g. wheels and/or chain tracks, of the mobile working machine.

The above-mentioned electromechanical power transmission chain comprises at least one electrical drive system according to the present invention.

The working machine may comprise a hydraulic system for driving some actuators of the working machine, e.g. a bucket of a bucket charger. In this case, the working machine comprises advantageously a liquid cooling system arranged to cool both the hydraulic system and the electromechanical power transmission chain.

In accordance with the invention, there is provided also a new method for producing many position signals each being indicative of rotational position of a resolver. A method according to the invention comprises:
generating an excitation signal at a first one of converters controlling voltages of two or more winding systems of one or more electrical machines,
transferring the excitation signal from the first one of the converters to the resolver and transferring information indicative of the polarity of the excitation signal from the first one of the converters to each of other ones of the converters,
transferring a first alternative signal and a second alternative signal from the resolver to the converters, the amplitudes of the first and second alternative signals being dependent on the rotational position of the resolver so that envelopes of the first and second alternative signals have a mutual phase shift, and
generating, at each of the converters, a position signal indicative of the rotational position of the resolver at least partly on the basis of the amplitudes of the first and second alternative signals and the polarity of the excitation signal.

A number of exemplifying and non-limiting embodiments of the invention are described in accompanied dependent claims.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF THE DRAWINGS

Exemplifying and non-limiting embodiments of the invention and their advantages are explained in greater detail below in the sense of examples and with reference to the accompanying drawings, in which.

DETAILED DESCRIPTION OF THE INVENTION

Figure 1:
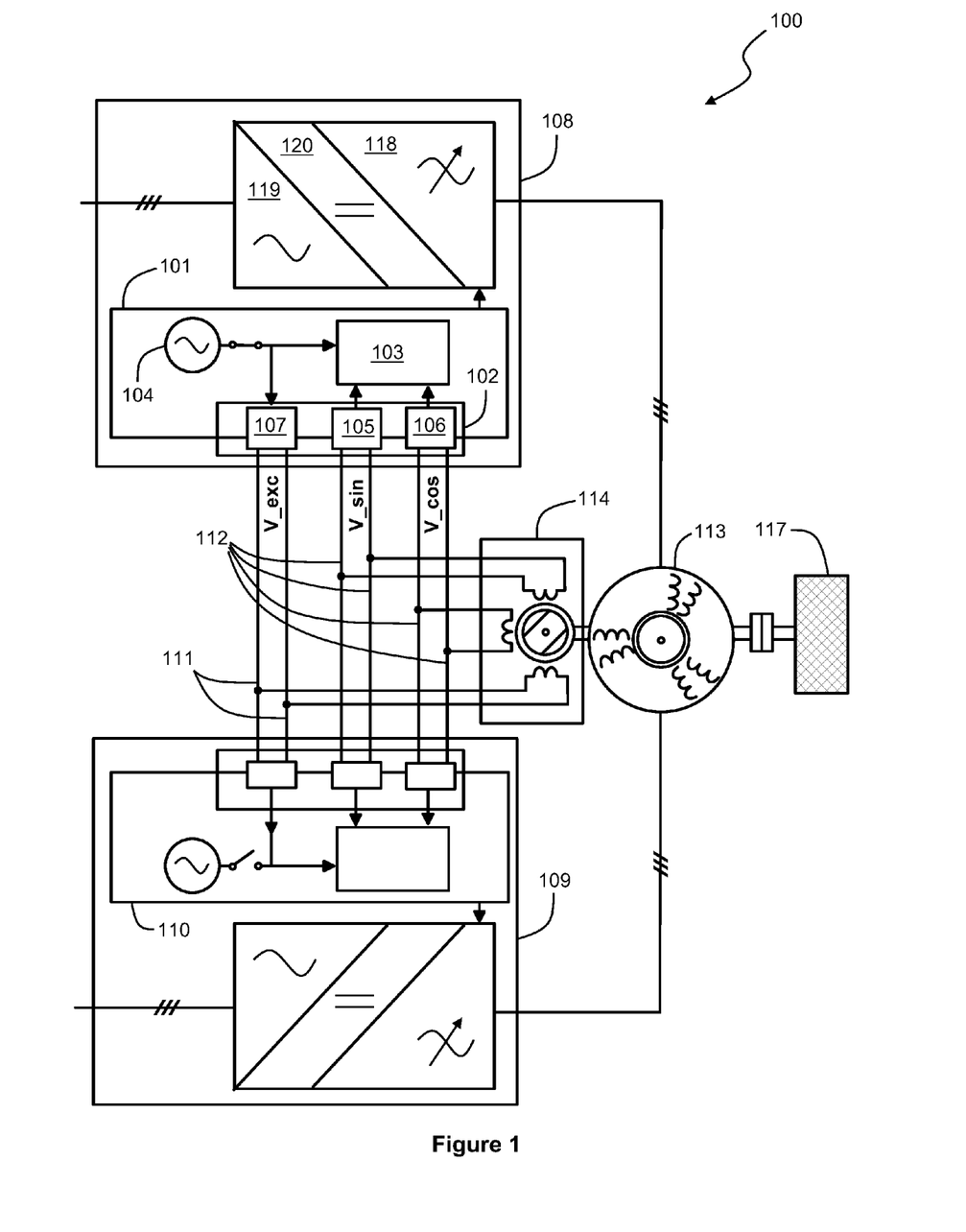
FIG. 1 shows a schematic illustration of an electrical drive system according to an exemplifying and non-limiting embodiment of the invention.

FIG. 1 shows a schematic illustration of an electrical drive system 100 according to an exemplifying and non-limiting embodiment of the invention. The electrical drive system comprises an electrical machine 113 comprising two winding systems. In this exemplifying case, the electrical machine comprises two three-phase stator windings so that there is an angle of 30 electrical degrees between the respective magnetic axes of the two three-phase stator windings. The electrical machine 113 can be, for example but not necessarily, a permanent magnet synchronous machine, an electrically excited synchronous machine, or an induction machine. The electrical machine 113 is arranged to drive an actuator 117. The actuator 117 can be, for example but not necessarily, a wheel, a chain track, a hydraulic pump, a cutter of a wood chipping machine, or some other actuator. The electrical drive system comprises a resolver 114 for detecting the rotational position of the rotor of the electrical machine 113. The resolver 114 can be for example a variable reluctance "VR" resolver. It is, however, also possible that the resolver is a wound-rotor resolver that comprises brushes or a rotary transformer for transferring an excitation signal to the rotor winding of the resolver. The resolver 114 receives an alternative excitation signal V_exc and produces first and second alternative signals V_cos and V_sin whose amplitudes are dependent on the rotational position of the resolver so that envelopes of the first and second alternative signals have a mutual phase shift. The excitation signal V_exc and the first and second alternative signals V_cos and V_sin can be modelled with the following equations:

$$V\_exc = V_0 \sin(\omega t),$$

$$V\_sin = V_0 \sin(\omega t + \varphi) \times TR \sin(\Theta), \quad (1)$$

$$V\_cos = V_0 \sin(\omega t + \varphi) \times TR \cos(\Theta),$$

where $V_0$ is the amplitude of the excitation signal, TR is the maximum transformation ratio between the excitation winding of the resolver and the output windings of the resolver, $\omega$ is the angular frequency of the excitation signal, t is time, $\varphi$ is a phase shift caused by the iron and copper losses in the resolver, and $\Theta$ is the electrical rotational angle of the rotor of the resolver. In the exemplifying case illustrated with the aid of equations (1), the above-mentioned phase shift between the envelopes of the first and second alternative signals is 90 degrees of the electrical angle $\Theta$.

The electrical drive system comprises a converter system for controlling voltages of the two winding systems of the electrical machine 113. The converter system comprises a converter 108 for controlling the voltages of a first one of the winding systems and a converter 109 for controlling the voltages of the second one of the winding systems. In this exemplifying case, each of the converters is a frequency converter. The converter 108 comprises an inverter stage 118 for producing controllable alternating voltages, a rectifier stage 119 for rectifying alternating voltage supplied to the converter, and an intermediate circuit 120 between the rectifier stage 119 and the inverter stage 118. The converter 108 further comprises a device 101 for producing a first position signal indicative of the rotational position of the resolver 114. The inverter stage 118 comprises a control system for controlling the alternating voltage supplied to the first one of the winding systems of the electrical machine 113 on the basis of the first position signal and other control quantities such as e.g. measured or estimated rotational speed of the electrical machine 113, measured or estimated torque generated by the electrical machine 113, a reference speed, a reference torque, and/or one or more other control quantities. Correspondingly, the converter 109 comprises an inverter stage, a rectifier stage, and a device 110 for producing a second position signal indicative of the rotational position of the resolver 114. The inverter stage of the converter 109 controls the alternating voltage supplied to the second one of the winding systems of the electrical machine 113 on the basis of the second position signal and one or more other control quantities.

The device 101 comprises a signal transfer interface 102 for receiving the first and second alternative signals V_sin and V_cos from the resolver 114. The device 101 comprises a processing system 103 for generating the first position signal at least partly on the basis of the amplitudes of the first and second alternative signals and the polarity of the excitation signal V_exc. The polarity, i.e. the sign, of the excitation signal V_exc is compared to the polarity of the V_sin and V_cos in order to find out whether the sin($\Theta$) shown in equations (1) is positive or negative and to find out whether the cos($\Theta$) is positive or negative. It is also possible that the phase shift $\varphi$ shown in equations (1) is taken into account when determining the signs of the sin($\Theta$) and cos($\Theta$). The value of $\varphi$ can be an empirically determined value that can be given to the processing system 103 as a parameter. The device 101 is configurable to operate in a first operational mode where a local signal generator 104 generates the excitation signal V_exc and the signal transfer interface 102 transmits the excitation signal to the resolver 114 and information indicative of the polarity of the excitation signal to the converter 109. The device 101 is configurable to operate also in a second operational mode where the signal transfer interface 102 receives the information indicative of the polarity of the excitation signal V_exc from the converter 109. In this exemplifying case, the signal transfer interface 102 comprises first electrical connectors 105 for receiving the first alternative signal V_sin, second electrical connectors 106 for receiving the second alternative signal V_cos, and third electrical connectors 107 for transmitting the excitation signal V_exc when the device 101 is in the first operational mode and for receiving the excitation signal when the device is in the second operational mode. Thus, the signal transfer port constituted by the third electrical connectors 107 is a bidirectional signal transfer port so that the signal transfer direction is determined by the operational mode. In this exemplifying case, the information indicative of the polarity of the excitation signal V_exc is transferred so that the excitation signal itself is transferred. The processing system 103 can be implemented with one or more processor circuits, each of which can be a programmable processor circuit provided with appropriate software, a dedicated hardware processor such as, for example, an application specific integrated circuit "ASIC", or a configurable hardware processor such as, for example, a field programmable gate array "FPGA". The device 110 of the converter 109 can be similar to the device 101.

In the exemplifying situation shown in FIG. 1, the device 101 is in the above-mentioned first operational mode where the signal generator 104 generates the excitation signal V_exc, and the device 110 is in the above-mentioned second operational mode where the device 110 receives the excitation signal V_exc from the device 101. The converter system comprises first signal transfer paths 111 for transferring the excitation signal V_exc generated by the device 101 to the device 102 and to the resolver 114. Furthermore, the converter system comprises second signal transfer paths 112 for transferring the first and second alternative signals V_sin and V_cos from the resolver 114 to the devices 101 and 110.

Figure 2:
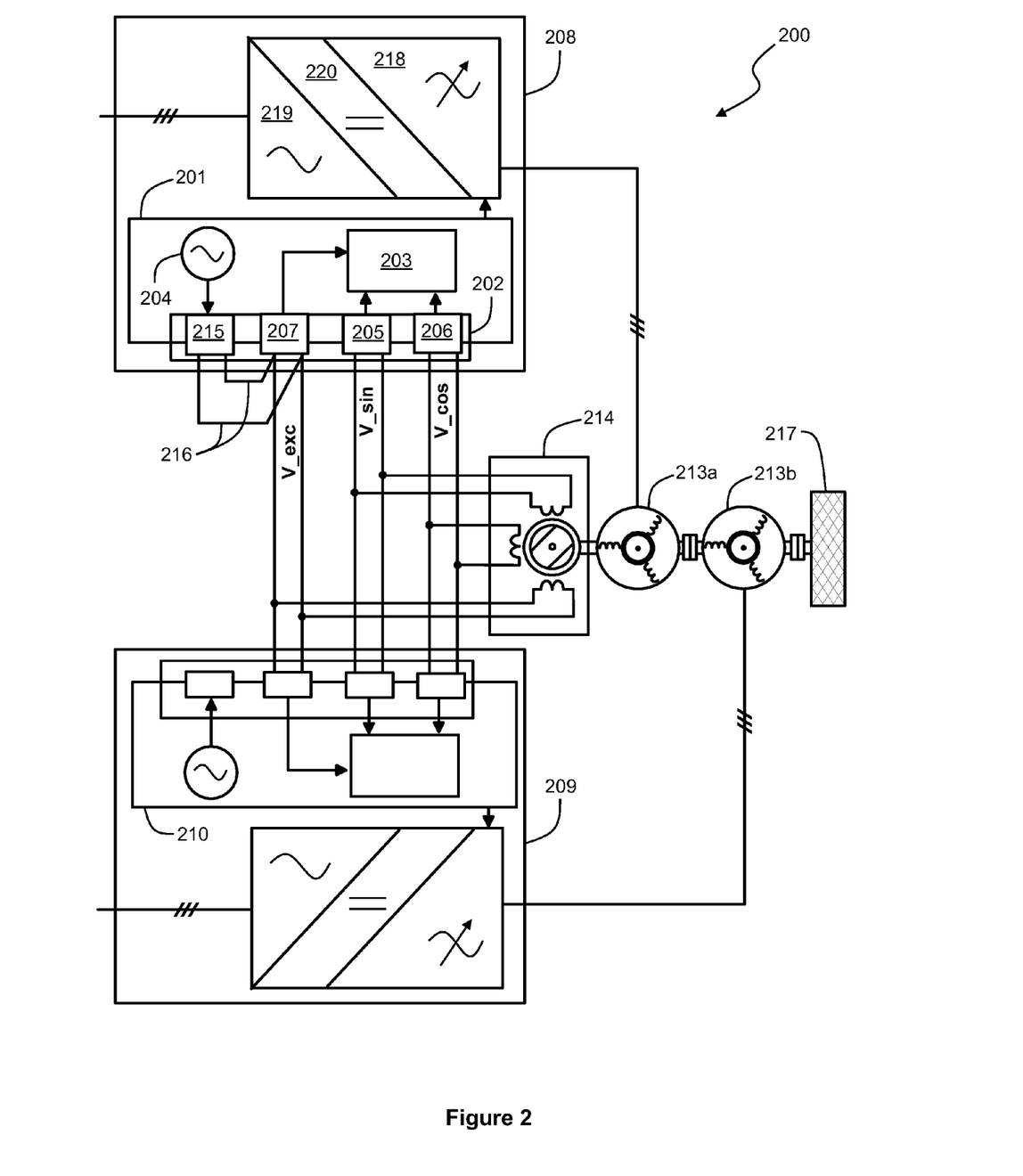
FIG. 2 shows a schematic illustration of an electrical drive system according to another exemplifying and non-limiting embodiment of the invention.

FIG. 2 shows a schematic illustration of an electrical drive system 200 according to an exemplifying and non-limiting embodiment of the invention. The electrical drive system comprises electrical machines 213a and 213b so that the shafts of the electrical machines are mechanically connected to each other. In this exemplifying case, each of the electrical machines comprises a three-phase stator winding. Each of the electrical machines 213a and 213b can be, for example but not necessarily, a permanent magnet synchronous machine, an electrically excited synchronous machine, or an induction machine. The electrical machines are arranged to drive an actuator 217. The electrical drive system comprises a resolver 214 for detecting the rotational position of the rotors of the electrical machines 213a and 213b. The resolver is advantageously a variable reluctance "VR" resolver. The resolver 214 receives an alternative excitation signal V_exc and produces first and second alternative signals V_cos and V_sin whose amplitudes are dependent on the rotational position of the resolver so that envelopes of the first and second alternative signals have a mutual phase shift.

The electrical drive system comprises a converter system for controlling voltages of the electrical machines 213a and 213b. The converter system comprises a converter 208 for controlling the voltages of the electrical machine 213a and a converter 209 for controlling the voltages of the electrical machine 213a. In this exemplifying case, each of the converters is a frequency converter. The converter 208 comprises an inverter stage 218, a rectifier stage 219, and an intermediate circuit 220 between the rectifier stage 219 and the inverter stage 218. The converter 208 further comprises a device 201 for producing a first position signal indicative of the rotational position of the resolver 214. The inverter stage 218 controls the alternating voltage supplied to the electrical machine 213a on the basis of the first position signal and one or more other control quantities. Correspondingly, the converter 209 comprises an inverter stage, a rectifier stage, and a device 210 for producing a second position signal indicative of the rotational position of the resolver 214. The inverter stage of the converter 209 controls the alternating voltage supplied to the electrical machine 213b on the basis of the second position signal and one or more other control quantities.

The device 201 comprises a signal transfer interface 202 for receiving the first and second alternative signals V_sin and V_cos from the resolver 214. The device 201 comprises a processing system 203 for generating the second position signal at least partly on the basis of the amplitudes of the first and second alternative signals and the polarity of the excitation signal V_exc. The device 201 is configurable to operate in a first operational mode where a local signal generator 204 generates the excitation signal V_exc and the signal transfer interface 202 transmits the excitation signal to the resolver 214 and the information indicative of the polarity of the excitation signal to the converter 209. The device 201 is configurable to operate also in a second operational mode where the signal transfer interface 202 receives the information indicative of the polarity of the excitation signal V_exc from the converter 209. The signal transfer interface 202 comprises first electrical connectors 205 for receiving the first alternative signal V_sin, second electrical connectors 206 for receiving the second alternative signal V_cos, third electrical connectors 215 for transmitting the excitation signal V_exc, and fourth electrical connectors 207 for receiving the excitation signal V_exc. Therefore, in this exemplifying case, the information indicative of the polarity of the excitation signal V_exc is transferred so that the excitation signal itself is transferred.

In the exemplifying situation shown in FIG. 2, the device 201 is in the above-mentioned first operational mode where the signal generator 204 generates the excitation signal V_exc, and the device 210 is in the above-mentioned second operational mode where the device 210 receives the excitation signal V_exc from the device 201. In this exemplifying case, the device 201 is configured to be in the first operational mode by using wirings 216 which connect the third electrical connectors 215 to the fourth electrical connectors 207 as illustrated in FIG. 2.

Figure 3:
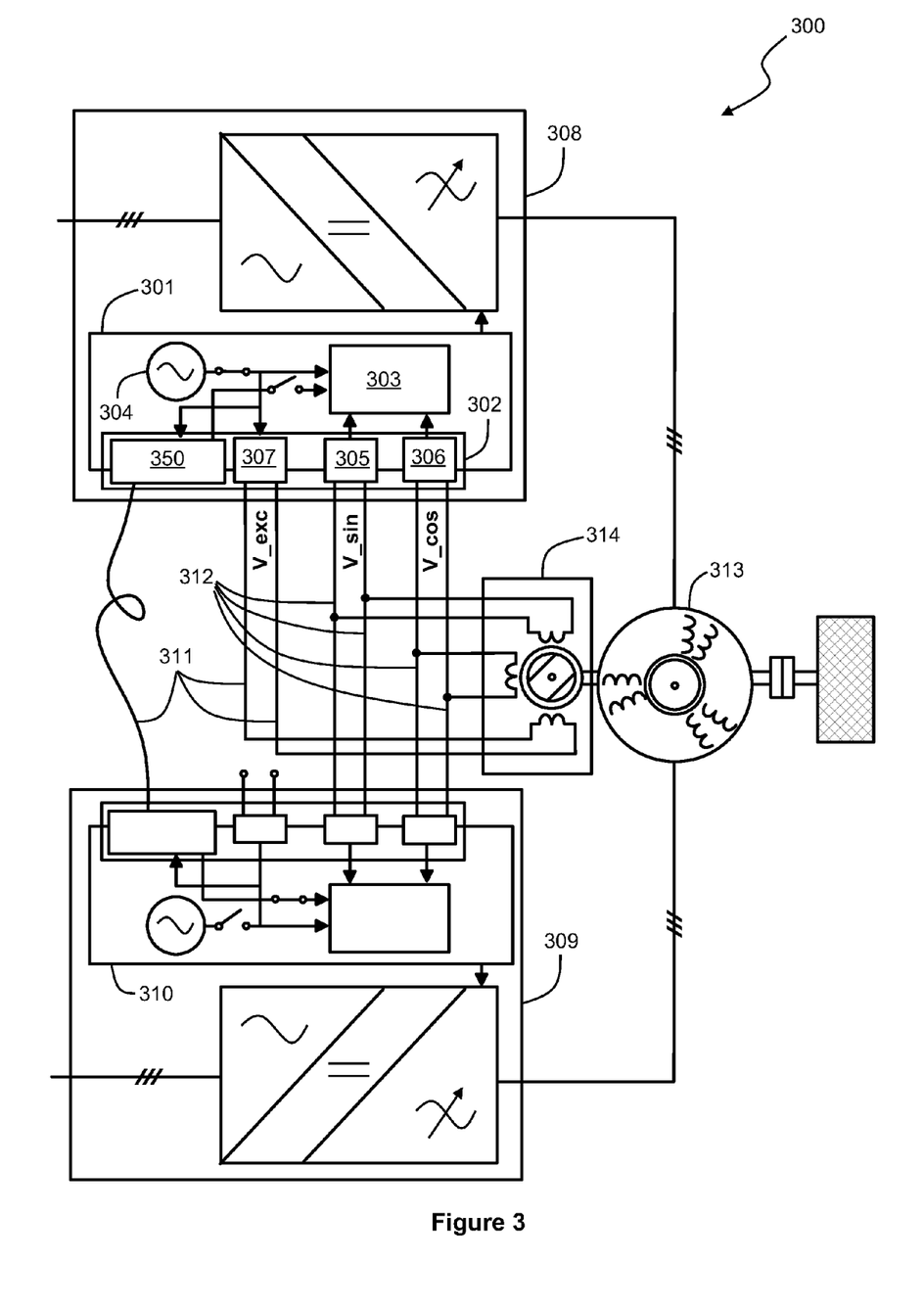
FIG. 3 shows a schematic illustration of an electrical drive system according to another exemplifying and non-limiting embodiment of the invention.

FIG. 3 shows a schematic illustration of an electrical drive system 300 according to an exemplifying and non-limiting embodiment of the invention. The electrical drive system comprises an electrical machine 313 comprising two winding systems. The electrical drive system comprises a resolver 314 for detecting the rotational position of the rotor of the electrical machine 313. The electrical drive system comprises a converter system for controlling voltages of the two winding systems of the electrical machine 313. The converter system comprises a converter 308 for controlling the voltages of a first one of the winding systems and a converter 309 for controlling the voltages of the second one of the winding systems. The converter 308 comprises a device 301 for producing a first position signal indicative of the rotational position of the resolver 314. Correspondingly, the converter 309 comprises a device 310 for producing a second position signal indicative of the rotational position of the resolver 314.

The device 301 comprises a signal transfer interface 302 for receiving, from the resolver 314, first and second alternative signals V_sin and V_cos whose amplitudes are dependent on the rotational position of the resolver. The device 301 comprises a processing system 303 for generating the first position signal at least partly on the basis of the amplitudes of the first and second alternative signals and the polarity of an excitation signal V_exc of the resolver. The device 301 is configurable to operate in a first operational mode where a local signal generator 304 generates the excitation signal V_exc and the signal transfer interface 302 transmits the excitation signal to the resolver 314 and information indicative of the polarity of the excitation signal to the converter 309. The device 301 is configurable to operate also in a second operational mode where the signal transfer interface 302 receives the information indicative of the polarity of the excitation signal V_exc from the converter 309. In this exemplifying case, the signal transfer interface 302 comprises first electrical connectors 305 for receiving the first alternative signal V_sin, second electrical connectors 306 for receiving the second alternative signal V_cos, third electrical connectors 307 for transmitting the excitation signal V_exc to the resolver 314 when the device 301 is in the first operational mode. The signal transfer interface 302 further comprises a transceiver 350 for transmitting, to the converter 309, the information indicative of the polarity of the excitation signal when the device 301 is in the first operational mode and for receiving, from the converter 309, the information indicative of the polarity of the excitation signal when the device 301 is in the second operational mode.

The transceiver 350 can be for example an electrical transceiver configured to determine an output electrical signal of the transceiver on the basis of the polarity of the excitation signal when the device 301 is in the first operational mode, and to detect the polarity of the excitation signal on the basis of an electrical signal received at the electrical transceiver when the device 301 is in the second operational mode. The electrical signal can have a first value when the excitation signal has a first polarity and a second value when the excitation signal has a second polarity opposite to the first polarity. The electrical signal can be a voltage signal or a current signal. For another example, the transceiver 350 can be an optical transceiver configured to determine an output optical signal of the transceiver in accordance with the polarity of the excitation signal when the device 301 is in the first operational mode, and to detect the polarity of the excitation signal on the basis of an optical signal received at the optical transceiver when the device 301 is in the second operational mode. The optical signal can be e.g. ON when the excitation signal has a first polarity and OFF when the excitation signal has a second polarity opposite to the first polarity.

In the exemplifying situation shown in FIG. 3, the device 301 is in the above-mentioned first operational mode where the signal generator 304 generates the excitation signal V_exc, and the device 310 is in the above-mentioned second operational mode where the device 310 receives the information indicative of the polarity of the excitation signal from the device 301. The converter system comprises first signal transfer paths 311 for transferring the excitation signal V_exc generated by the device 301 to the resolver 314 and for transferring the information indicative of the polarity of the excitation signal from the device 301 to the device 310. Furthermore, the converter system comprises second signal transfer paths 312 for transferring the first and second alternative signals V_sin and V_cos from the resolver 314 to the devices 301 and 310.

Figure 4:
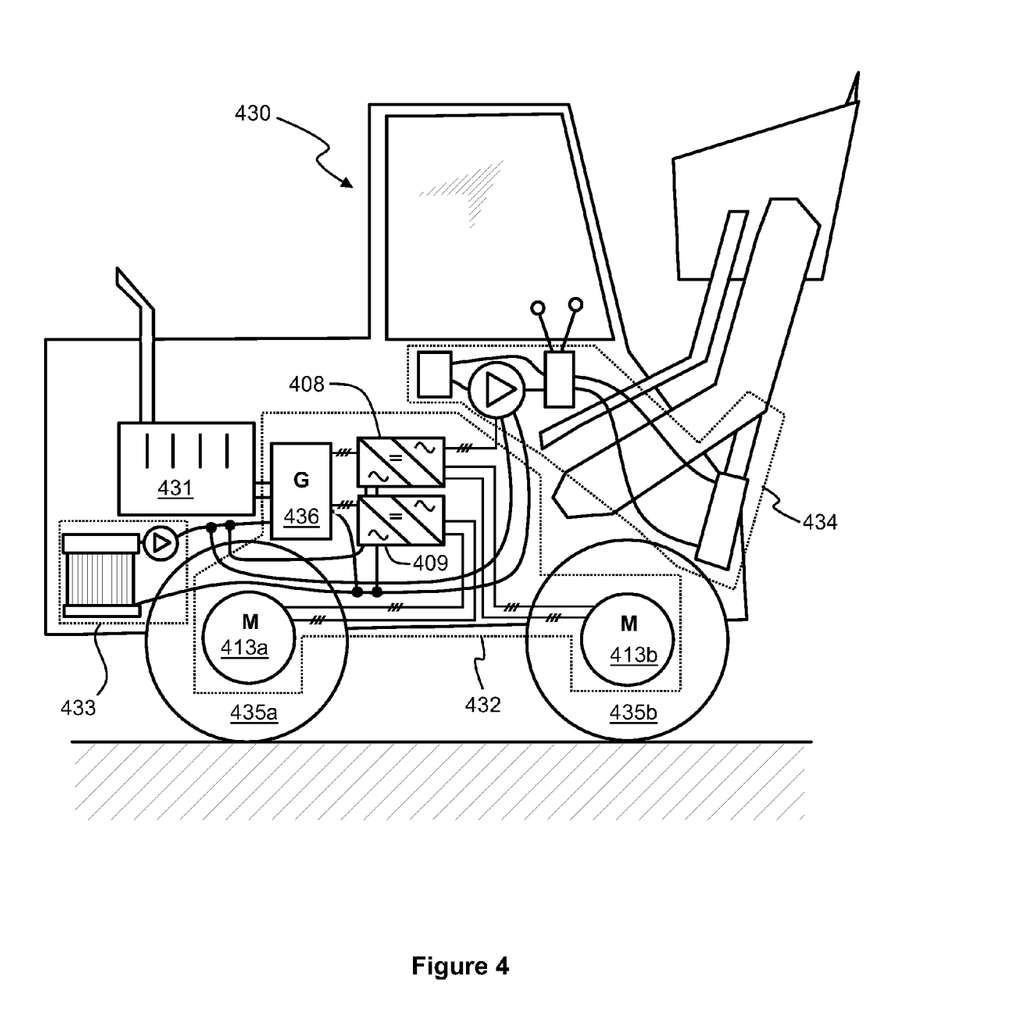
FIG. 4 shows a schematic illustration of a working machine according to an exemplifying and non-limiting embodiment of the invention.

FIG. 4 shows a schematic illustration of a working machine 430 according to an exemplifying and non-limiting embodiment of the invention. In this exemplifying case, the working machine is a bucket charger but the working machine could as well be a tractor, a road drag, a bulldozer, an excavator, a stone crusher, or a wood chipping machine, or any other working machine. The working machine comprises a combustion engine 431 that can be e.g. a diesel engine, an Otto-cycle engine, or a turbine engine. The working machine comprises an electromechanical power transmission chain 432 between the combustion engine and wheels of the working machine. In FIG. 3, two of the wheels are denoted with reference numbers 435a and 435b. The electromechanical power transmission chain comprises an electrical machine 436 the rotor of which is connected to the shaft of the combustion engine 431. The electromechanical power transmission chain further comprises electrical machines at the hubs of the wheels. In FIG. 3, two of the electrical machines at the hubs of the wheels are denoted with reference numbers 413a and 413b. The electromechanical power transmission chain 432 further comprises a converter system that comprises converters 408 and 409 for controlling voltages of the electrical machines located at the hubs of the wheels. In this exemplifying case, the converters 408 and 409 are frequency converters for converting the voltages produced by the electrical machine 436 into voltages having amplitudes and frequencies suitable for the electrical machines located at the hubs of the wheels. In this exemplifying case, each of the electrical machines at the hubs of the wheels comprises two three-phase stator windings so that there is an angle of 30 electrical degrees between the respective magnetic axes of the two three-phase stator windings. Concerning each of these electrical machines, one of the three-phase stator windings is fed by the converter 408 and the other of the three-phase stator windings fed by the converter 409. The converters 408 and 409 have advantageously separate converter stages for all the electrical machines located at the hubs of the wheels so that each of these electrical machines can be controlled individually on the basis of the rotational position of the rotor of the electrical machine under consideration and on the basis of one or more other control quantities. Each of these electrical machines is provided with a resolver for detecting the rotational position of the rotor of the electrical machine under consideration. Each of the converters 408 and 409 comprises devices for producing position signals indicative of the rotational positions of the resolvers. One of the converters, e.g. the converter 408, is in a first operational mode where the converter generates an excitation signal for the resolvers and transmits the excitation signal to the resolvers and information indicative of the polarity of the excitation signal to the other converter, e.g. the converter 409. The other converter 409 is in a second operational mode where the converter 309 receives the information indicative of the polarity of the excitation signal from the converter 408.

A working machine according to an exemplifying and non-limiting embodiment of the invention comprises a liquid cooling system 433 arranged to cool the electro-mechanical power transmission chain 432.

A working machine according to an exemplifying and non-limiting embodiment of the invention comprises a liquid cooling system arranged to cool both a hydraulic system 434 of the mobile working machine and the electromechanical power transmission chain 432.

In a working machine according to an exemplifying and non-limiting embodiment of the invention, the electromechanical power transmission chain comprises a battery element arranged to respond to peak power needs exceeding the maximum power available from the combustion engine 431. The battery element can be connected, for example, to the intermediate circuits of the converters 408 and 409 with the aid of controllable direct voltage converters.

Figure 5:
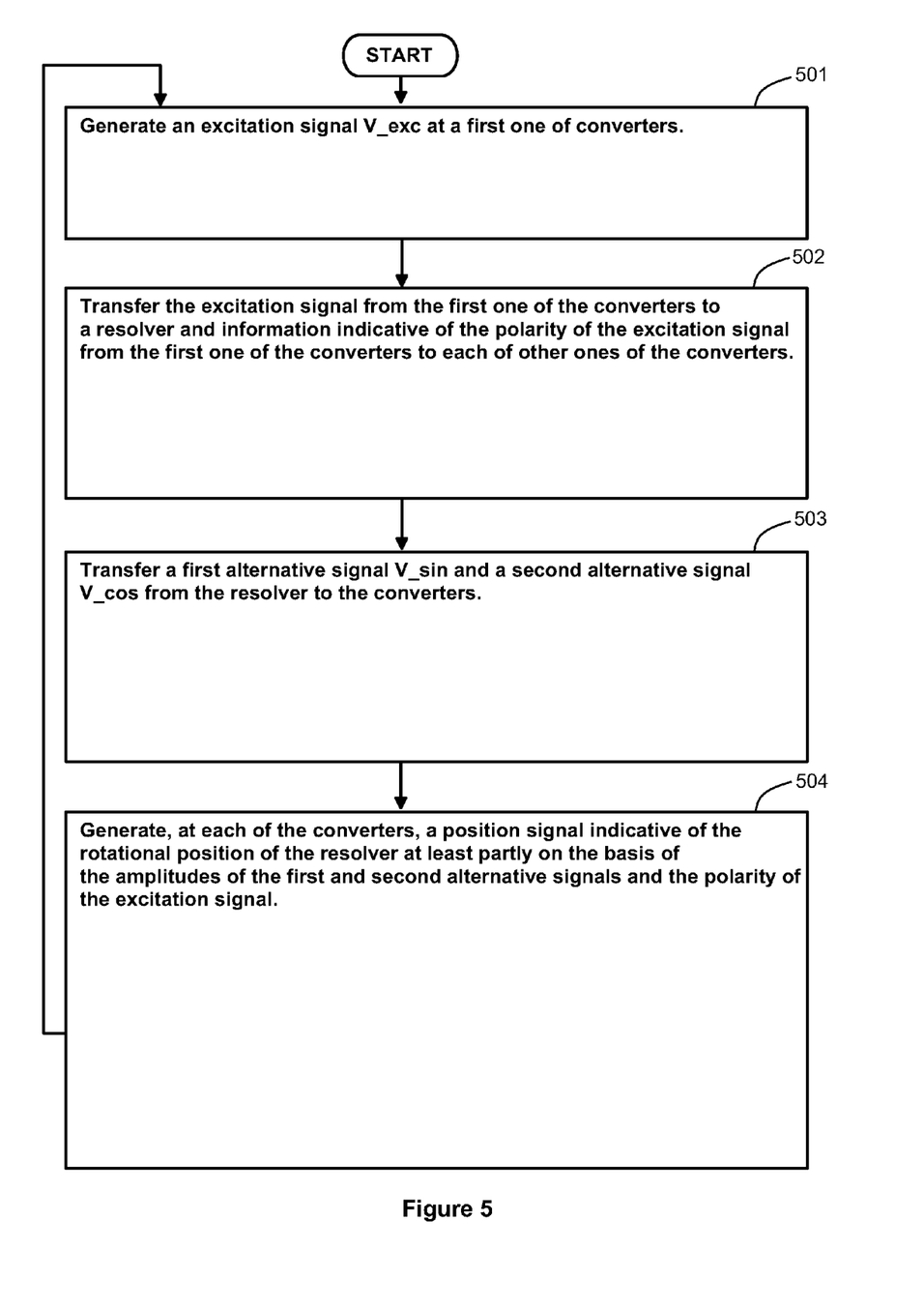
FIG. 5 shows a flowchart of a method according to an exemplifying and non-limiting embodiment of the invention for producing position signals indicative of rotational position of a resolver.

FIG. 5 shows a flowchart of a method according to an exemplifying and non-limiting embodiment of the invention for producing position signals each being indicative of rotational position of a resolver. The method comprises the following actions:

action 501: generating an excitation signal at a first one of converters controlling voltages of two or more winding systems of one or more electrical machines,     action 502: transferring the excitation signal from the first one of the converters to the resolver and transferring information indicative of the polarity of the excitation signal from the first one of the converters to each of other ones of the converters,     action 503: transferring a first alternative signal and a second alternative signal from the resolver to the converters, the amplitudes of the first and second alternative signals being dependent on the rotational position of the resolver so that envelopes of the first and second alternative signals have a mutual phase shift, and     action 501: generating, at each of the converters, a position signal indicative of the rotational position of the resolver at least partly on the basis of the amplitudes of the first and second alternative signals and the polarity of the excitation signal.

The specific examples provided in the description given above should not be construed as limiting the scope and/or the applicability of the appended claims. List and groups of examples provided in the description given above are not exhaustive unless otherwise explicitly stated.

What is claimed is:

1. A device for producing a position signal indicative of rotational position of a variable reluctance resolver, the device comprising:

a signal transfer interface for receiving a first alternative signal and a second alternative signal, amplitudes of the first and second alternative signals being dependent on the rotational position of the variable reluctance resolver so that envelopes of the first and second alternative signals have a mutual phase shift, a processing system for generating the position signal at least partly on the basis of the amplitudes of the first and second alternative signals and a polarity of an excitation signal of the variable reluctance resolver, and a signal generator, wherein:

the device is configurable to operate in a first operational mode where a1) the signal generator is configured to generate the excitation signal, b1) the signal transfer interface is configured to transmit the excitation signal to the variable reluctance resolver, and c1) the signal transfer interface is configured to transmit information indicative of the polarity of the excitation signal to one or more other devices, and the device is configurable to operate in a second operational mode a2) where the signal transfer interface is configured to receive the information indicative of the polarity of the excitation signal from one of the other devices and b2) where the received information indicative of the polarity of the excitation signal is independent of operation of the signal generator of the device.

2. A device according to claim 1, wherein the signal transfer interface comprises first electrical connectors for receiving the first alternative signal, second electrical connectors for receiving the second alternative signal, and third electrical connectors for transmitting the excitation signal to the variable reluctance resolver and to the one or more other devices when the device is in the first operational mode and for receiving the excitation signal from the one of the other devices when the device is in the second operational mode.

3. A device according to claim 1, wherein the signal transfer interface comprises first electrical connectors for receiving the first alternative signal, second electrical connectors for receiving the second alternative signal, third electrical connectors for transmitting the excitation signal to the variable reluctance resolver and to the one or more other devices, and fourth electrical connectors for receiving the excitation signal from the one of the other devices.

4. A device according to claim 1, wherein the signal transfer interface comprises first electrical connectors for receiving the first alternative signal, second electrical connectors for receiving the second alternative signal, third electrical connectors for transmitting the excitation signal to the variable reluctance resolver, and a transceiver for transmitting, to the one or more other devices, the information indicative of the polarity of the excitation signal when the device is in the first operational mode and for receiving, from the one of the other devices, the information indicative of the polarity of the excitation signal when the device is in the second operational mode.

5. A device according to claim 4, wherein the transceiver is an electrical transceiver configured to determine an output electrical signal of the transceiver on the basis of the polarity of the excitation signal when the device is in the first operational mode, and to detect the polarity of the excitation signal on the basis of an electrical signal received at the electrical transceiver when the device is in the second operational mode.

6. A device according to claim 4, wherein the transceiver is an optical transceiver configured to determine an output optical signal of the transceiver in accordance with the polarity of the excitation signal when the device is in the first operational mode, and to detect the polarity of the excitation signal on the basis of an optical signal received at the optical transceiver when the device is in the second operational mode.

7. A converter system comprising converters for controlling voltages of two or more winding systems of one or more electrical machines, wherein:

the converters comprise devices so that each of the converters comprise one of the devices, each of the devices being suitable for producing a position signal indicative of rotational position of a resolver for detecting rotational position of the one or more electrical machines and each of the devices comprising:

a signal transfer interface for receiving a first alternative signal and a second alternative signal, amplitudes of the first and second alternative signals being dependent on the rotational position of the resolver so that envelopes of the first and second alternative signals have a mutual phase shift, a processing system for generating the position signal at least partly on the basis of the amplitudes of the first and second alternative signals and a polarity of an excitation signal of the resolver, and a signal generator, wherein:

each of the devices is configurable to operate in a first operational mode where the signal generator is configured to generate the excitation signal and the signal transfer interface is configured to transmit the excitation signal to the resolver and to transmit information indicative of the polarity of the excitation signal to the other devices, and each of the devices is configurable to operate in a second operational mode where the signal transfer interface is configured to receive the information indicative of the polarity of the excitation signal from one of the other devices and where the received information indicative of the polarity of the excitation signal is independent of operation of the signal generator, a first one of the devices is in the first operational mode and other ones of the devices are in the second operational mode, the converter system comprises first signal transfer paths for transferring the excitation signal generated by the first one of the devices to the resolver for detecting the rotational position of the one or more electrical machines and for transferring the information indicative of the polarity of the excitation signal from the first one of the devices to the other ones of the devices, and the converter system comprises second signal transfer paths for transferring the first and second alternative signals from the resolver to the devices.

8. A converter system according to claim 7, wherein each of the converters is a frequency converter.

9. An electrical drive system comprising:

one or more electrical machines comprising two or more winding systems, a resolver for detecting rotational position of the one or more electrical machines, and a converter system comprising converters for controlling the one or more electrical machines, the converters comprising devices so that each of the converters comprise one of the devices, each of the devices being suitable for producing a position signal indicative of rotational position of the resolver and each of the devices comprising:

a signal transfer interface for receiving a first alternative signal and a second alternative signal, amplitudes of the first and second alternative signals being dependent on the rotational position of the resolver so that envelopes of the first and second alternative signals have a mutual phase shift, a processing system for generating the position signal at least partly on the basis of the amplitudes of the first and second alternative signals and a polarity of an excitation signal of the resolver, and a signal generator, wherein:

each of the devices is configurable to operate in a first operational mode where the signal generator is configured to generate the excitation signal and the signal transfer interface is configured to transmit the excitation signal to the resolver and to transmit information indicative of the polarity of the excitation signal to the other devices, each of the devices is configurable to operate in a second operational mode where the signal transfer interface is configured to receive the information indicative of the polarity of the excitation signal from one of the other devices and where the received information indicative of the polarity of the excitation signal is independent of operation of the signal generator, a first one of the devices is in the first operational mode and other ones of the devices are in the second operational mode, the converter system comprises first signal transfer paths for transferring the excitation signal generated by the first one of the devices to the resolver for detecting the rotational position of the one or more electrical machines and for transferring the information indicative of the polarity of the excitation signal from the first one of the devices to the other ones of the devices, and the converter system comprises second signal transfer paths for transferring the first and second alternative signals from the resolver to the devices.

10. An electrical drive system according to claim 9, wherein at least two of the winding systems are parts of a first one of the one or more electrical machines and directions of respective magnetic axes of the at least two winding systems are different from each other.

11. An electrical drive system according to claim 9, wherein at least one of the winding systems is a part of a first one of the electrical machines and at least one of the winding systems is a part of a second one of the electrical machines, shafts of the first and second ones of the electrical machines being mechanically interconnected.

12. An electrical drive system according to claim 9, wherein the resolver is a variable reluctance resolver.

13. A method for producing rotational position signals, the method comprising:

transferring a first alternative signal and a second alternative signal from a resolver to two or more converters controlling voltages of two or more winding systems of one or more electrical machines, amplitudes of the first and second alternative signals being dependent on rotational position of the resolver so that envelopes of the first and second alternative signals have a mutual phase shift, generating, at each of the converters, a position signal indicative of the rotational position of the resolver at least partly on the basis of the amplitudes of the first and second alternative signals and a polarity of an excitation signal of the resolver, generating the excitation signal at a first one of the converters, and transferring the excitation signal from the first one of the converters to the resolver and transferring information indicative of the polarity of the excitation signal from the first one of the converters to each of other ones of the converters.

* * * * *